United States Patent
Farah

(10) Patent No.: US 10,181,988 B1
(45) Date of Patent: Jan. 15, 2019

(54) SYSTEMS AND METHODS FOR MONITORING A NETWORK DEVICE

(71) Applicant: Control4 Corporation, Salt Lake City, UT (US)

(72) Inventor: Mina Farah, Huntington Beach, CA (US)

(73) Assignee: Control4 Corporation, Salt Lake City, UT (US)

(*) Notice: Subject to any disclaimer, the term of this patent is extended or adjusted under 35 U.S.C. 154(b) by 154 days.

(21) Appl. No.: 15/247,709

(22) Filed: Aug. 25, 2016

Related U.S. Application Data

(60) Provisional application No. 62/209,810, filed on Aug. 25, 2015.

(51) Int. Cl.
| | |
|---|---|
| *G06F 15/173* | (2006.01) |
| *H04L 12/26* | (2006.01) |
| *H04L 12/24* | (2006.01) |
| *H04L 29/08* | (2006.01) |
| *H04L 12/28* | (2006.01) |

(52) U.S. Cl.
CPC .............. *H04L 43/08* (2013.01); *H04L 12/28* (2013.01); *H04L 41/06* (2013.01); *H04L 43/04* (2013.01); *H04L 67/10* (2013.01)

(58) Field of Classification Search
CPC ... H04L 41/00; H04L 41/5009; H04L 43/022; H04L 43/062; H04L 43/10; H04L 63/1425
USPC .................................................. 709/223, 224
See application file for complete search history.

(56) References Cited

U.S. PATENT DOCUMENTS

| | | | |
|---|---|---|---|
| 2003/0214913 A1 | 11/2003 | Kan et al. | |
| 2004/0073655 A1* | 4/2004 | Kan | H04L 41/5009 709/224 |
| 2006/0176824 A1 | 8/2006 | Laver et al. | |

\* cited by examiner

*Primary Examiner* — Wing F Chan
*Assistant Examiner* — Andrew Woo
(74) *Attorney, Agent, or Firm* — Austin Rapp

(57) ABSTRACT

A method for monitoring a network device is described. The method includes analyzing a traffic log that records network activity between the network device and a cloud server. The method also includes determining that the network device is offline based on the traffic log analysis. The method further includes sending an alert to a user device indicating that the network device is offline.

20 Claims, 8 Drawing Sheets

SYSTEMS AND METHODS FOR MONITORING A NETWORK DEVICE

RELATED APPLICATIONS

This application is related to and claims priority from U.S. Provisional Patent Application Ser. No. 62/209,810, filed Aug. 25, 2015, for "ALERTS BASED ON TRAFFIC GENERATED BY NETWORK DEVICES," which is incorporated herein by reference.

TECHNICAL FIELD

The present disclosure relates generally to electronic devices. More specifically, the present disclosure relates to systems and methods for monitoring a network device.

BACKGROUND

In recent years, the price of electronic devices has decreased dramatically. In addition, the types of electronic devices that can be purchased have continued to increase. For example, laptop computers, tablets, smart phones, DVD players, large screen TVs, multi-carousel CD and DVD players, MP3 players, video game consoles and similar consumer electronic items have become more widely available while continuing to drop in price.

The decreasing prices and increasing types of electronic components have packed today's homes and businesses with modern conveniences. Typical homes and businesses now include more electronic devices than ever before. While these electronic devices may provide convenience and entertainment, many also require control. Moreover, these electronic devices consume electrical power and may consume other resources.

Currently, a lot of network load is created by pings generated to check the device status of many different network devices. Furthermore, some inaccurate results may be obtained because network devices can go into sleep mode and not respond to pings (but they are still active). Although it is possible to test services running on the network devices, each device could be running different services, which would need to be discovered and recorded. This is quite cumbersome, especially since new devices could not be monitored without identifying the running services or waking the device from sleep mode. As illustrated by this discussion, systems and methods for monitoring a network device may be beneficial.

DETAILED DESCRIPTION

Figure 1:
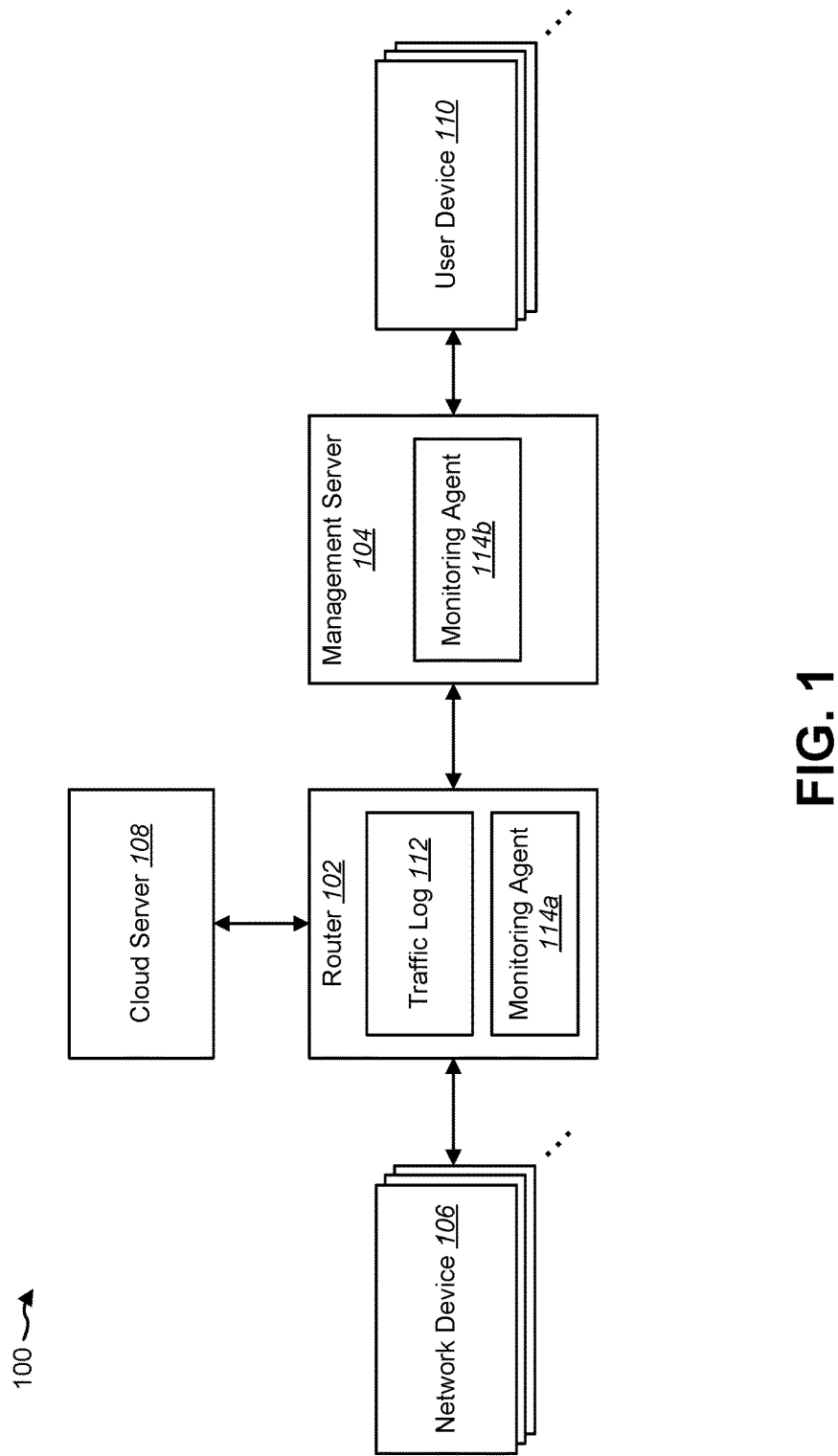
FIG. 1 is a block diagram of a monitoring system for monitoring a network device.

A method for monitoring a network device is described. The method includes analyzing a traffic log that records network activity between the network device and a cloud server. The method also includes determining that the network device is offline based on the traffic log analysis. The method further includes sending an alert to a user device indicating that the network device is offline.

The network device may be configured to periodically exit a sleep mode. The network device may then connect to a local area network (LAN) and communicate with the cloud server via a wide area network (WAN).

Analyzing the traffic log may include checking whether the network device generated one or more packets that start from a LAN of the network device and go to the cloud server via a WAN.

Determining that the network device is offline may include determining that the network device did not send any packets to the cloud server within a certain period of time. The certain period of time may be pre-defined or user-specified.

Determining that the network device is offline may include detecting a pattern of when the network device generates network traffic. The network device may be considered offline upon determining that the network device stopped generating network traffic according to the pattern.

The method may be performed by a router that generates the traffic log. The method may be performed by a monitoring device that receives the traffic log from a router that generates the traffic log. The monitoring device may be a management server.

The monitoring device may receive an updated traffic log from the router on a periodic basis. The monitoring device may analyze the updated traffic log to determine whether the network device is offline.

The network device may be included in a network device monitoring list comprising network devices to be monitored for online activity. A router may configure the traffic log according to the network device monitoring list.

The method may also include attempting to contact the network device before sending the alert. The alert may be sent when the contact attempt is unsuccessful. The alert may be sent to the user device through a management server.

A management server configured for monitoring a network device is also described. The management server includes a processor and memory in electronic communication with the processor. Instructions stored in the memory are executable to receive, from a router, a traffic log that records network activity of the network device. The instructions are also executable to analyze the traffic log for network activity between the network device and a cloud server. The instructions are further executable to determine that the network device is offline based on the traffic log analysis. The instructions are additionally executable to send an alert to a user device indicating that the network device is offline.

The management server may also send, to the router, a network device monitoring list comprising network devices to be monitored for online activity, wherein the router configures the traffic log according to the network device monitoring list.

A router configured for monitoring a network device is also described. The router includes a processor and memory in electronic communication with the processor. Instructions stored in the memory are executable to generate a traffic log that records network activity of the network device. The instructions are also executable to analyze the traffic log for network activity between the network device and a cloud serve. The instructions are further executable to determine that the network device is offline based on the traffic log analysis. The instructions are additionally executable to send an alert to a user device indicating that the network device is offline.

The router may receive, from a management server, a network device monitoring list comprising network devices to be monitored for online activity. The router may configure the traffic log according to the network device monitoring list.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram of a monitoring system 100 for monitoring a network device 106. The monitoring system 100 may include a router 102 and a management server 104 configured to monitor one or more network devices 106.

The monitoring system 100, or portions thereof, may be implemented in one or more configurations. For example, monitoring system 100 may be implemented as a local area network (LAN), a wireless LAN (WLAN), a personal area network (PAN), or a Wide Area Network (WAN), or other configuration. For example, the router 102 may coordinate one or more network devices 106 in a LAN or WLAN. The router 102 may allow the one or more network devices 106 to communicate with one or more remote devices via a WAN.

The network devices 106 may communicate using wired technologies (e.g., coaxial, Ethernet, fiber optic) or wireless technologies (e.g., microwave, radio frequency (RF) (e.g., cellular, Wifi, Bluetooth, ZigBee), infrared).

The network devices 106 may also be referred to as client devices. Examples of network devices 106 include desktop computers, laptop computers, tablet devices, netbooks, cellular phones, smart phones, routers, personal digital assistants (PDAs), thermostats, controllers, sensors, actuators, etc.

In an implementation, a network device 106 may be an Internet of Things (IoT) device. IoT is a protocol and corresponding hardware and software that allow network devices 106 to be sensed and/or controlled remotely across existing network infrastructure. Examples of IoT network devices 106 include thermostats, controllers, sensors, actuators, remote controllers, security cameras, virtual reality headsets, home appliances.

An exemplary network may contain hundreds of IoT network devices 106. One of their main benefits results from the amount of IoT network devices 106 that can be deployed and the amount of data that can be collected, as well as the amount of per-device control.

A network device 106 may be configured to communicate with a cloud server 108 via the router 102. For example, a network device 106 may establish a network connection with the router 102. The network device 106 may have an associated IP address and MAC address. In an example, the network device 106 may be a sensor (e.g., thermostat) that is configured to report to a certain cloud server 108 at regular intervals. The network device 106 may send data to the cloud server 108 or receive data from the cloud server 108.

As used herein, the term "cloud" refers to an Internet-based computing network of one or more remote servers. The cloud server 108 may store, manage, and process data received from a network device 106, rather than a local server or a personal computer. The cloud server 108 may also remotely send data and/or commands to a network device 106.

A network device 106 may be configured to enter a sleep mode and periodically exit the sleep mode. For example, the network device 106 may establish a network connection with the router 102 and then enter a sleep mode (also referred to as a low-power mode) to conserve power. While in sleep mode, the network device 106 may be offline. As used herein, the term "offline" refers to a state of a network device 106 when the network device 106 is not accessible (or responsive) to network traffic.

At certain times, the network device 106 may exit the sleep mode and comes online. For example, the network device 106 may exit sleep mode, connect to a LAN and communicate with the cloud server 108 via a WAN. As used herein, the term "online" refers to a state of a network device 106 when the network device 106 is accessible (or responsive) to network traffic.

Currently, a significant amount of network load is created by pings generated to check the device status of many different network devices 106. Furthermore, inaccurate results may be obtained because network devices 106 can go into sleep mode and do not respond to pings (but the network devices 106 are still active). Additionally, although it is possible to test services running on the network devices 106, each network device 106 could be running different services, which would need to be discovered and recorded. This is quite cumbersome, especially since new network devices 106 could not be monitored without identifying the running services or waking the device from sleep mode.

Therefore, the usual methods of monitoring network devices 106 are problematic. For example, pinging the devices regularly or checking TCP/UDP services on the network devices 106 to see whether they are active results in a high load on the network, and it is complex to track which network device 106 is running which service.

As seen in this discussion, monitoring network devices 106 is a challenge. Monitoring is especially challenging for network devices 106 (e.g., IoT devices) that periodically come online and then enter a prolonged sleep state. The systems and methods described herein provide for monitoring network device status while at the same time reducing network load. The described systems and methods also provide a way to produce accurate network device status results to give network administrators confidence in their network.

Because the network devices 106 are configured go "online" periodically, their device status can be monitored in a unique way. As described above, many network devices 106 go into a sleep mode to save battery power. At regular intervals (for example, hourly), these network devices 106 go online to send data to a cloud server 108.

These network devices 106 have an IP address and a MAC address. Therefore, the router 102 that this data goes through can log the network traffic (for example, LAN to WAN traffic) between a network device 106 and its cloud server 108. The router 102 may generate a traffic log 112 for one or more network devices 106. Exemplary traffic may include, as a non-limiting example, traffic that starts from the local network (LAN) and goes to the internet (WAN).

In the present disclosure, a monitoring agent 114 may be used to monitor one or more network devices 106. The monitoring agent 114 may be implemented in hardware and/or software on an electronic device.

In one implementation, a monitoring agent 114a may be integrated with the router 102. In another implementation, the monitoring agent 114b can be located externally. For example, a management server 104 may include a monitoring agent 114b.

In other implementations, the monitoring agent 114 may be located in a place other than solely in the router 102 or on a management server 104. For example, the monitoring agent 114 may be distributed and may have a server component located in the management server 104, and a client component located in the router 102. Alternatively, the client component may be located in a separate physical device (e.g., a patroller device). Other configurations or setups of the monitoring agent 114 are possible as well.

The monitoring agent 114 can analyze the traffic logs 112 and make various determinations. For example, the monitoring agent 114 may check the router traffic log 112 to see whether and when the network device 106 has generated traffic. If a network device 106 did not send any packets to the cloud server 108 for a certain period of time, the monitoring agent 114 can determine that the network device 106 is offline. The monitoring agent 114 may then send an alert to a user device 110.

The certain period of time may be referred to as a contact period. The contact period may be pre-defined, specified, or even calculated based on prior network device activity. For example, the monitoring agent 114 may detect a pattern based on historical information for a particular network device 106. If the network device 106 stops behaving according to the pattern, an alert may be sent. Alternatively, alerts may be sent if a network device 106 does not generate traffic in a maximum contact period set by the monitoring agent 114 or specified by the user.

Some of the data that can be obtained from the traffic log 112 includes, as non-limiting examples, not only the time that a network device 106 has generated traffic, but also the IP address, MAC address, etc. of the network device 106. The monitoring agent 114 can look at the router Address Resolution Protocol (ARP) table and monitor the ARP requests of one or more network devices 106. Then, the monitoring agent 114 can determine whether the network device 106 is online. In other words, the monitoring agent 114 may determine whether a given network device 106 is reachable or part of the network.

When the monitoring agent 114 determines that a network device 106 is offline, the monitoring agent 114 can generate an alert. The alert may notify a user or a network administrator about the discovered offline network device 106 so that they can take corrective action.

In an exemplary implementation, the monitoring agent 114 can check the router traffic log 112 every minute. When the monitoring agent 114 notices that a network device 106 has not generated traffic for one hour, the monitoring agent 114 can make the determination that the device is offline (these monitoring timeframes/thresholds can be set automatically by the monitoring agent 114 or by the network administrator).

Analyzing the traffic log 112 to monitor a network device 106 works especially well for IoT network devices 106 because IoT network devices 106 must periodically go online. So long as there is periodic data from the network device 106 at the router 102, the monitoring agent 114 can conclude that the network device 106 is active, or online. If device status was checked by pings, however, the ping might catch the IoT network device 106 in sleep mode, and the monitoring agent 114 might conclude that the device was offline/inactive. This would be an inaccurate result. As such, making device status determinations by analyzing traffic data from the router 102 (or another device) is beneficial.

To send the alert, the monitoring agent 114 can connect to the management server 104, which sends an alert to an associated user device 110. Examples of a user device 110 include a smartphone or desktop computer. The management server 104 may send the alert to one or more user devices 110 using text messages (e.g., SMS), popup notifications (e.g., iOS, Android notifications), email, an application (e.g., app) installed on a user device 110, a website or other communication means.

The management server 104 may be a cloud server that is configured to communicate with one or more routers 102. For example, the management server 104 may coordinate monitoring over a plurality of routers 102 located in one or more networks. In an implementation, the one or more routers 102 may communicate with the management server 104 over the Internet.

The management server 104 may configure a router 102 with the network devices 106 that the router 102 is to generate a traffic log 112. For example, the management server 104 may provide the router 102 with a list of network devices 106 to be monitored for online activity. The router 102 may then record the online activity for network devices 106 included in the network device monitoring list. It should be noted that different routers 102 may receive different network device monitoring lists. A given router 102 may receive a network device monitoring list that includes the network devices 106 for which the router 102 handles network traffic. Therefore, the management server 104 may coordinate network device monitoring over one or more distributed networks.

In an implementation, the monitoring agent 114a is integrated with the router 102. In this implementation, the monitoring agent 114a can read the traffic log 112 files locally. Therefore, in this implementation, a separate connection to the router 102 is not required, which may reduce the amount of time necessary to obtain network device status. Upon determining that a network device 106 is offline, the monitoring agent 114a may initiate an alert by instructing the management server 104 to send the alert to one or more user devices 110 associated with the offline network device 106.

In another implementation the monitoring agent 114 is located externally to the router 102. For example, the management server 104 may include the monitoring agent 114b. If located externally, the monitoring agent 114b can connect to any router 102 that allows traffic logging. The monitoring agent 114b may retrieve a traffic log 112 from the router 102.

The monitoring agent 114b can communicate with the router 102 over Telnet, Secure Shell (SSH), Simple Network Management Protocol (SNMP), or any other suitable protocol to specify which network devices 106 to monitor. The software can then obtain the traffic log 112 from the router 102 using a number of methods. If using syslog, the traffic log 112 can be obtained in real time. If using SSH, the traffic log 112 can be obtained periodically (e.g., every 3 minutes).

In another implementation, the router 102 can create a small output file containing the traffic log 112 or even send the traffic log 112 data to the monitoring agent 114b. The output file or sent data can be read by the monitoring agent 114b periodically, and can then be analyzed by the monitoring agent 114b.

Upon receiving the traffic log 112 from the router 102, the monitoring agent 114b of the management server 104 may check when network devices 106 have generated traffic. For example, the monitoring agent 114b may analyze the traffic log 112 and make a determination about whether a network device 106 is online or offline. If the network device 106 is offline, then the monitoring agent 114b may send an alert.

The benefits of the described systems and methods include real-time active monitoring of network devices 106 using the cloud. The described systems and methods reduce network load because there is no need to ping a large group of network devices 106 or to check TCP or UDP services on the network devices 106. The described systems and methods also increase efficiency in monitoring because relevant data may be obtained from a single device (e.g., the router 102 or management server 104) to make a decision. This is proactive rather than passive monitoring and results in faster data collection about device status.

Additional benefits include automatic analysis and decision of whether a network device 106 is offline or online, which can be based on behavior analysis. Accurate alerts may be provided that indicate whether a network device is actually down, instead of in sleep mode or some other state.

Figure 2:
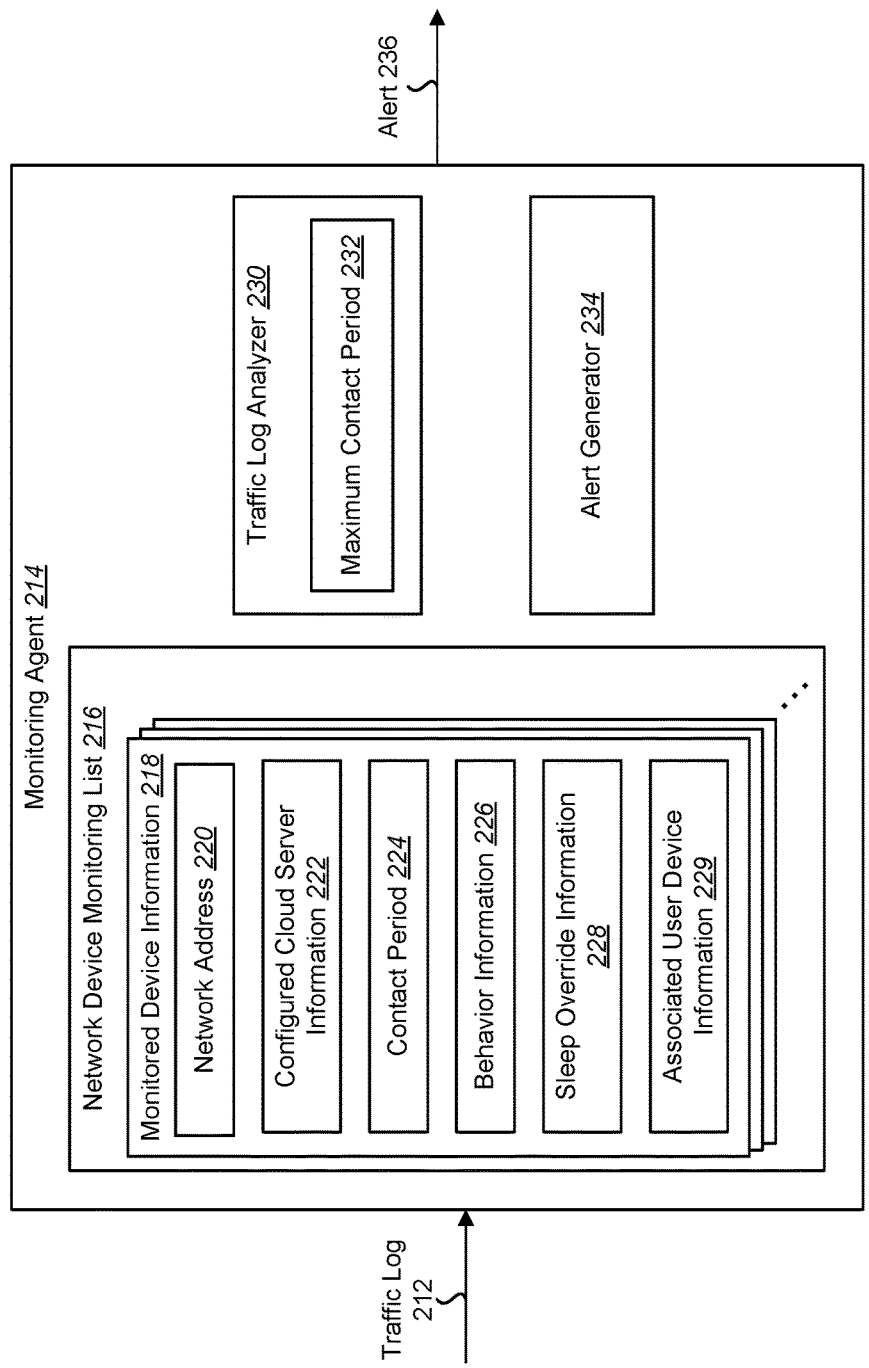
FIG. 2 is a block diagram illustrating a configuration of a monitoring agent.

FIG. 2 is a block diagram illustrating a configuration of a monitoring agent 214. The monitoring agent 214 may be included in a router 102, a management server 104 or another device configured to receive a traffic log 212.

The monitoring agent 214 may receive one or more traffic logs 212. A traffic log 212 may record network activity between a network device 106 and a cloud server 108. For example, the monitoring agent 214 may receive the traffic log 212 from a router 102.

The monitoring agent 214 may include a network device monitoring list 216 that includes monitored device information 218 for one or more network devices 106. The monitoring agent 214 may use the network device monitoring list 216 to configure which network devices 106 are monitored in the traffic log 212. For example, the monitoring agent 214 may provide the network device monitoring list 216 (or a subset of the network device monitoring list 216) to a router 102. The router 102 may then record the network activity of the network devices 106 included in the network device monitoring list 216. Using the monitoring agent 214, a user can enable traffic logging for those network devices 106 included in the network device monitoring list 216.

The monitored device information 218 may correspond to a given network device 106. The monitored device information 218 may include a network address 220 (e.g., IP address and/or MAC address) of the network device 106. The monitored device information 218 may also include configured cloud server information 222 that indicates which cloud server 108 the given network device 106 is configured to communicate with. For example, the configured cloud server information 222 may include an IP address or URL of the cloud server 108.

The monitored device information 218 may also include a contact period 224 for the given network device 106. The contact period 224 may be an amount of time within which the network device 106 should contact its cloud server 108 before the network device 106 is considered offline. The contact period 224 may be preconfigured in the monitoring agent 214 or the contact period 224 may be user-defined. For example, an administrator may assign a certain amount of time to the contact period 224 of a given network device 106.

The monitored device information 218 may also include behavior information for a given network device 106. Upon analyzing the traffic log 212, the monitoring agent 214 may determine a pattern for when the network device 106 contacts its cloud server 108. For example, the monitoring agent 214 may determine that the network device 106 contacts its cloud server 108 every hour. The monitoring agent 214 may record this pattern in the behavior information 226. The monitoring agent 214 may use this behavior information 226 to determine whether the network device 106 is offline.

The monitored device information 218 may also include sleep override information 228. The sleep override information 228 may include one or more protocols, commands or mechanisms that may be used to force a network device 106 to exit a sleep state. For example, a wake-on-LAN (WoL) message may be sent to a sleeping network device 106 to force the network device 106 out of a sleep state. In another example, a message sent to a certain logical port of the network device 106 may force the network device 106 to exit a sleep state.

The monitoring agent 214 may include a traffic log analyzer 230. The traffic log analyzer 230 may check the traffic log 212 for the IP addresses of monitored network devices 106 to see if those network devices 106 generated any packets to the WAN interface. The traffic log analyzer 230 may also obtain a time stamp from the traffic log 212.

In one implementation, the traffic log analyzer 230 can check whether the network device 106 generated network traffic during the contact period 224. If traffic log 212 indicates that the network device 106 did not contact its cloud server 108 within the contact period 224, the traffic log analyzer 230 may declare that the network device 106 is offline.

In the case that a given network device 106 does not have a specific preconfigured or user-defined contact period 224, the traffic log analyzer 230 may check whether the network device 106 generated network traffic during a maximum contact period 232. The maximum contact period 232 may be a default maximum allowable amount of time within which a network device 106 should contact its cloud server 108. In an example, the maximum contact period 232 may be 24 hours (i.e., one day). If the traffic log 212 indicates that the network device 106 did not contact its cloud server 108 within the maximum contact period 232 (e.g., 24-hour period), the traffic log analyzer 230 may declare that the network device 106 is offline.

In another implementation, the traffic log analyzer 230 can monitor with what regularity packets have been generated for a network device 106. For example, the traffic log analyzer 230 may check for a baseline over a number of days. The traffic log analyzer 230 may determine a pattern for that network device 106 based on the contact intervals. The monitoring agent 214 may record this pattern in the behavior information 226 for that network device 106. If at some point the network device 106 does not generate traffic as expected in the pattern, the network device 106 may be determined to be offline.

The monitoring agent 214 may include an alert generator 234. The alert generator 234 may send an alert 236 when a network device 106 is found to be offline. An alert 236 may be may be sent to a user device 110 to notify a user to take corrective action. The alert 236 may be sent by email, SMS, iOS or Android notification, etc. The alert 236 can go through the management server 104 to an associated user device 110, as indicated by the associated user device information 229.

The alert 236 may indicate, for example, that a network device 106 is not online. Additionally, the alert 236 may indicate that the network device 106 has not been online for a certain period of time, or is not functioning as expected.

In another implementation, the monitoring agent 214 can obtain traffic logs 212 from third-party devices that are not routers 102. Such third-party devices may not be IP-based. For example, traffic logs 212 may be obtained from a home automation control system gateway that keeps track of activity from exemplary sources like Zigbee, Bluetooth devices, Infrared communication devices, Comport devices, etc. The status of these network devices 106 can still be checked at pre-defined, specified, or calculated intervals, the monitoring agent 214 can make determinations, and then alerts 236 can be sent to the user if there is no response after a pre-defined, specified, or calculated period of time.

Figure 3:
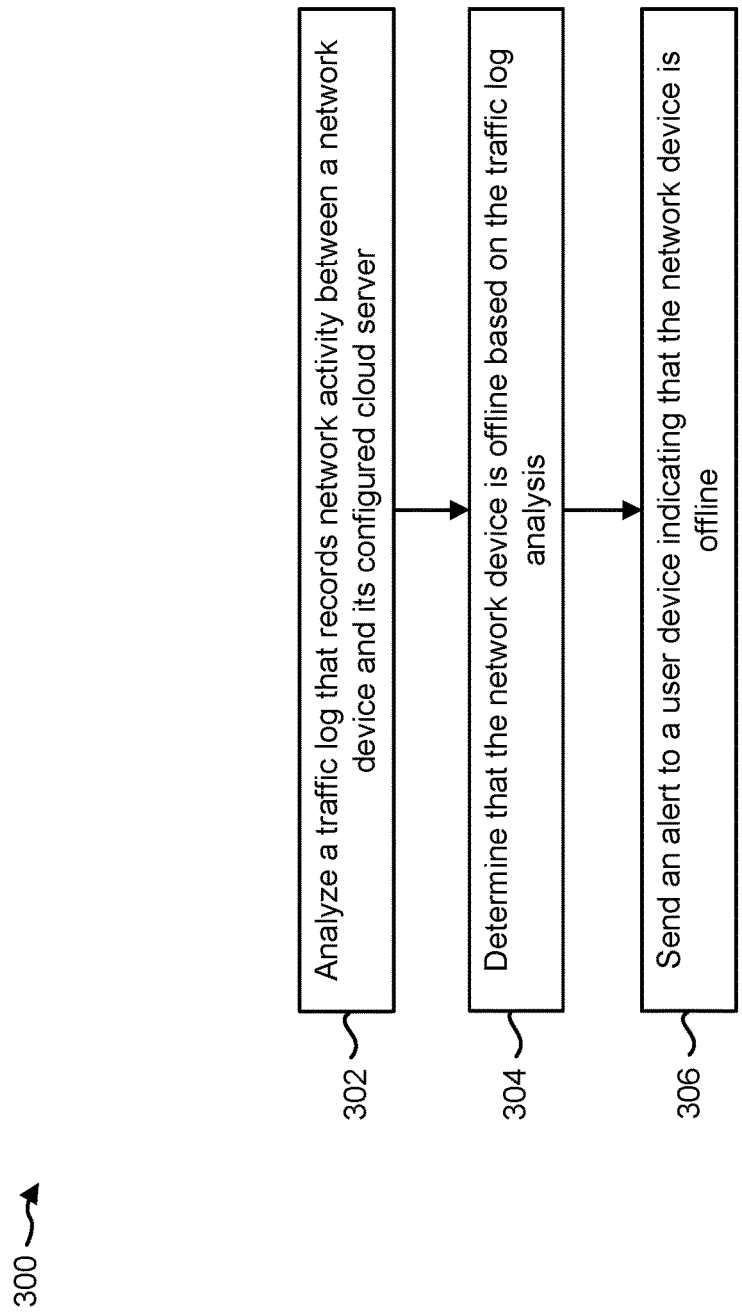
FIG. 3 is a flow diagram illustrating one configuration of a method for monitoring a network device.

FIG. 3 is a flow diagram illustrating one configuration of a method 300 for monitoring a network device 106. The method 300 may be implemented by a monitoring agent 114 that is included in a router 102, a management server 104 or another computing device. Therefore, the method 300 may be performed by a router 102 that generates a traffic log 112. Alternatively, the method 300 may be performed by a monitoring device (e.g., management server 104) that receives a traffic log 112 from the router 102 or other non-IP based logging device.

The monitoring agent 114 may analyze 302 a traffic log 112 that records network activity between the network device 106 and its configured cloud server 108. The network device 106 may be configured to periodically exit a sleep mode, connect to a local area network (LAN) and communicate with the cloud server 108 via a wide area network (WAN). The monitoring agent 114 may check whether the network device 106 generated one or more packets that start from a LAN of the network device 106 and go to the cloud server 108 via a WAN.

A router 102 may be configured to record the online activity for network devices 106. For example, the router 102 may record the online activity of one or more network devices 106 included in a list of network devices 106 to be monitored for online activity.

The monitoring agent 114 may determine 304 that the network device 106 is offline based on the traffic log analysis. In one approach, the monitoring agent 114 may determine that the network device 106 did not send any packets to the cloud server 108 within a certain period of time (i.e., contact period 224). In one implementation, the certain period of time may be pre-defined. In another implementation, the certain period of time may be user-specified.

In another approach, the monitoring agent 114 may determine 304 that the network device 106 is offline based on network device 106 behavior information 226. For example, the monitoring agent 114 may detect a pattern of when the network device 106 generates network traffic based on one or more traffic logs 112. The monitoring agent 114 may store this pattern in a behavior information 226 database. Using a subsequent traffic log 112, the monitoring agent 114 may determine that the network device 106 stopped generating network traffic according to the pattern.

The monitoring agent 114 may send 306 an alert 236 to a user device 110 indicating that the network device 106 is offline. For example, the alert 236 may be sent 306 to the user device 110 through the management server 104. The alert 236 may be sent 306 using text messages (e.g., SMS), popup notifications (e.g., iOS, Android notifications), email, an application (e.g., app) installed on a user device 110, a website or other communication means.

Figure 4:
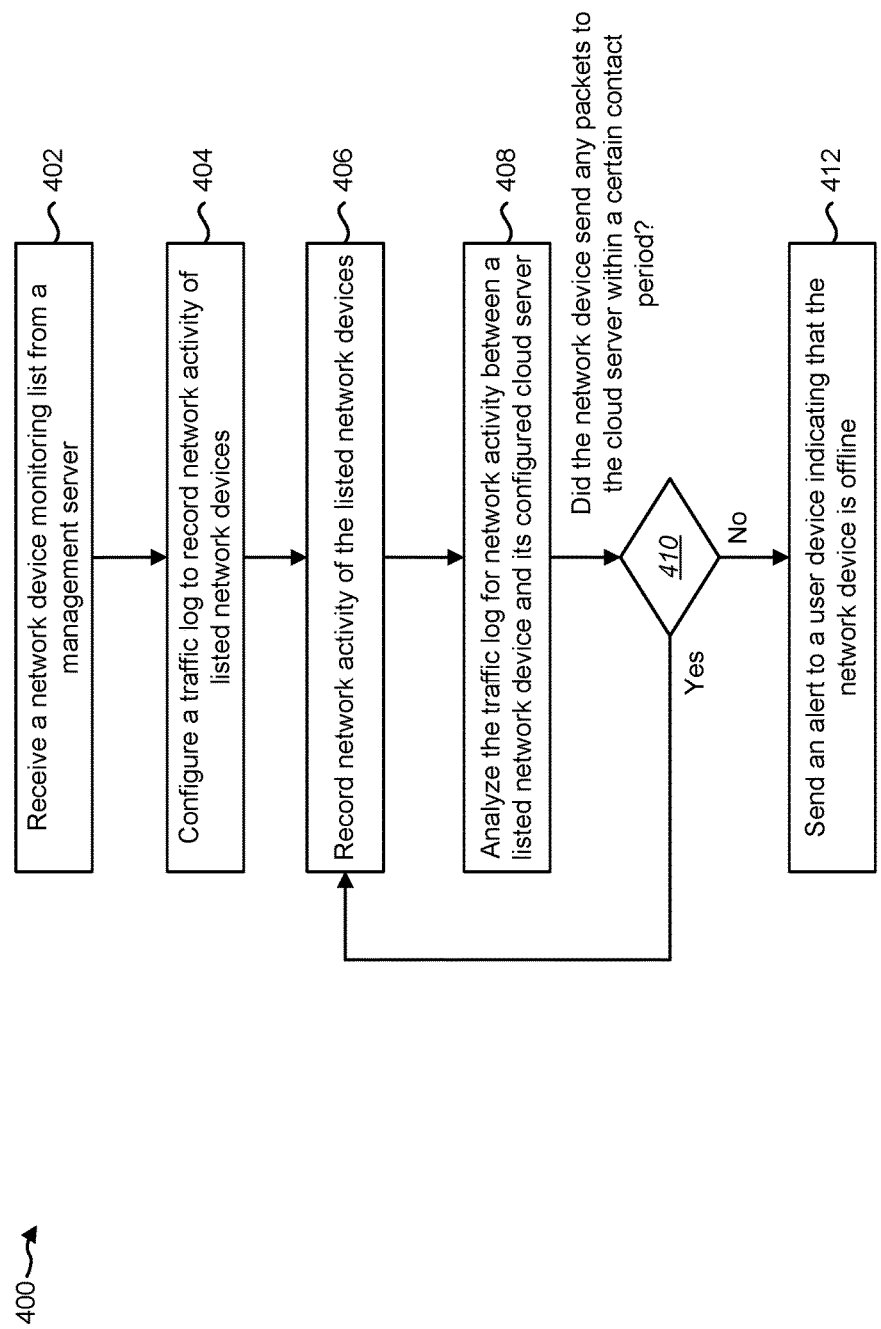
FIG. 4 is a flow diagram illustrating one configuration of a method for monitoring a network device by a router.

FIG. 4 is a flow diagram illustrating one configuration of a method 400 for monitoring a network device 106 by a router 102. The router 102 may include a monitoring agent 114a. The router 102 may be configured to communicate with a management server 104.

The router 102 may receive 402 a network device monitoring list 216 from the management server 104. The network device monitoring list 216 may be a list of network devices 106 to be monitored by the router 102 for online activity.

The router 102 may configure 404 a traffic log 112 to record the network activity of listed network devices 106. For example, the traffic log 112 may include a timestamp for when a listed network device 106 has generated traffic. The traffic log 112 may also include one or more network addresses 220 (e.g., IP, MAC address, etc.) of the listed network device 106.

The router 102 may record 406 network activity of the listed network devices 106. In an implementation, the router 102 can look at the router Address Resolution Protocol (ARP) table and monitor the ARP requests of one or more network devices 106.

The router 102 may analyze 408 the traffic log 112 for network activity between a listed network device 106 and its configured cloud server 108. For example, the router 102 may check whether the network device 106 generated one or more packets that start from a LAN of the network device 106 and go to the cloud server 108 via a WAN.

The router 102 may determine 410 whether the network device 106 sent any packets to the cloud server 108 within a certain contact period 224. The contact period 224 may be pre-defined or user-specified. If the network device 106 did send one or more packets to the cloud server 108 within the contact period 224, then the router 102 may continue to record 406 and analyze 408 the network activity of the listed network devices 106.

If the router 102 determines 410 that the network device 106 did not send one or more packets to the cloud server 108 within the contact period 224, then the router 102 may send 412 an alert 236 to a user device 110 indicating that the network device 106 is offline. In an implementation, the alert 236 may be sent 412 to the user device 110 through the management server 104.

Figure 5:
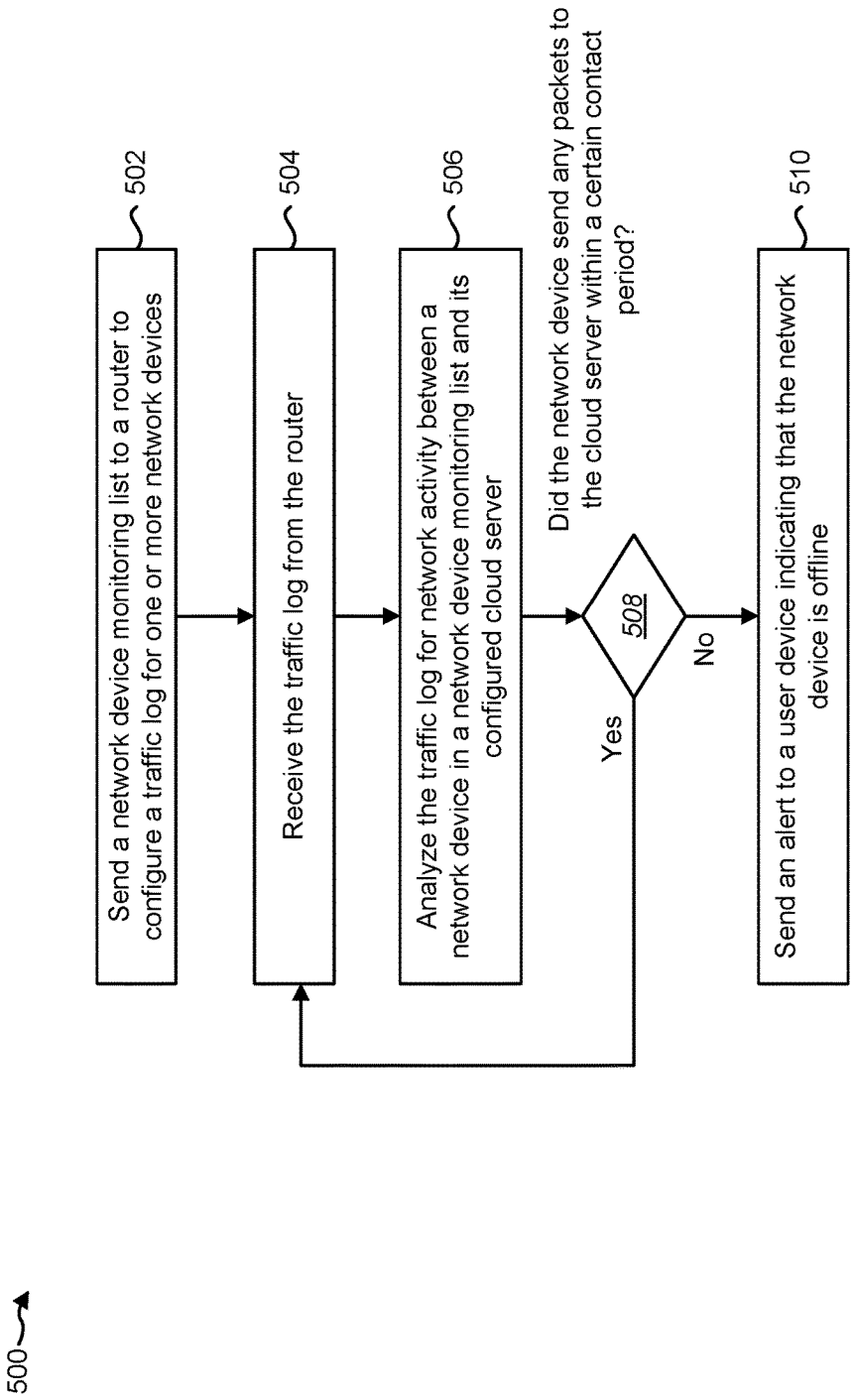
FIG. 5 is a flow diagram illustrating one configuration of a method for monitoring a network device by a management server.

FIG. 5 is a flow diagram illustrating one configuration of a method 500 for monitoring a network device 106 by a management server 104. The management server 104 may include a monitoring agent 114b. The management server 104 may be configured to communicate with one or more routers 102.

The management server 104 may send 502 a network device monitoring list 216 to a router 102. The network device monitoring list 216 may be a list of network devices 106 to be monitored by the router 102 for online activity. The router 102 may configure the traffic log 112 according to the network device monitoring list 216.

The management server 104 may receive 504 a traffic log 112 from the router 102. The router 102 may record network activity of the listed network devices 106 in the traffic log 112. The traffic log 112 may include, for example, a timestamp for when a network device 106 has generated traffic. The traffic log 112 may also include one or more network addresses 220 (e.g., IP, MAC address, etc.) of the network device 106.

The management server 104 may analyze 506 the traffic log 112 for network activity between a listed network device 106 and its configured cloud server 108. For example, the management server 104 may check whether the network device 106 generated one or more packets that start from a LAN of the network device 106 and go to the cloud server 108 via a WAN.

The management server 104 may determine 508 whether the network device 106 sent any packets to the cloud server 108 within a certain contact period 224. The contact period 224 may be pre-defined or user-specified. If the network device 106 did send one or more packets to the cloud server 108 within the contact period 224, then the management server 104 may continue to receive 504 and analyze 506 the traffic log 112 from the router 102. For example, the management server 104 may receive 504 an updated traffic log 112 from the router 102 on a periodic basis. The management server 104 may analyze 506 the updated traffic log 112 to determine whether the network device 106 is offline.

If the management server 104 determines 508 that the network device 106 did not send one or more packets to the cloud server 108 within the contact period 224, then the management server 104 may send 510 an alert 236 to a user device 110 indicating that the network device 106 is offline. In an implementation, the management server 104 may send 510 the alert 236 to a plurality of user devices 110 that are associated with the network device 106. In another implementation, the management server 104 may send 510 the alert 236 to an email or messaging account (e.g., SMS) of a particular user (e.g., administrator).

Figure 6:
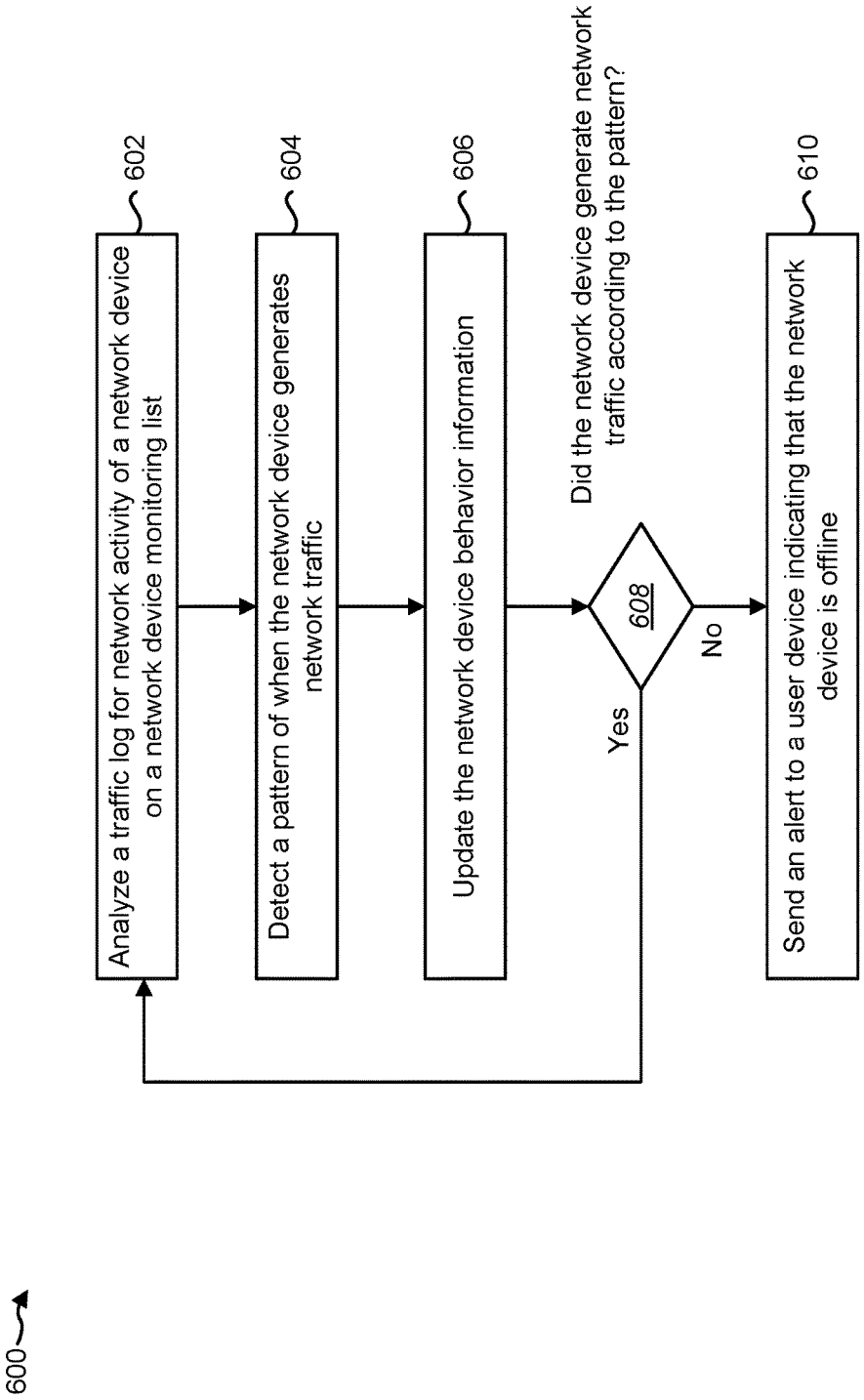
FIG. 6 is a flow diagram illustrating another configuration of a method for monitoring a network device.

FIG. 6 is a flow diagram illustrating another configuration of a method 600 for monitoring a network device 106. The method 600 may be implemented by a monitoring agent 114 that is included in a router 102, a management server 104 or another computing device. Therefore, the method 600 may be performed by a router 102 that generates a traffic log 112. Alternatively, the method 600 may be performed by a monitoring device (e.g., management server 104) that receives a traffic log 112 from a router 102 or other non-IP based logging device.

The monitoring agent 114 may analyze 602 a traffic log 112 for network activity of a network device 106 in a network device monitoring list 216. For example, the monitoring agent 114 may check whether the network device 106 generated one or more packets that start from a LAN of the network device 106 and go to its configured cloud server 108 via a WAN.

The monitoring agent 114 may detect 604 a pattern of when the network device 106 generates network traffic. For example, the monitoring agent 114 may detect a pattern based on historical information for a particular network device 106. The monitoring agent 114 can monitor with what regularity packets have been generated for a network device 106. For example, the monitoring agent 114 may check for a baseline over a number of days. The monitoring agent 114 may detect 604 a pattern for that network device 106 based on the contact intervals.

The monitoring agent 114 may update 606 the network device behavior information 226. For example, the monitoring agent 114 may record the detected pattern in a behavior information 226 database for that network device 106.

The monitoring agent 114 may determine 608 whether the network device 106 generated network traffic according to the pattern. For example, if the network device 106 contacted its cloud server 108 within the detected intervals, the network device 106 is found to be following the detected pattern. The monitoring agent 114 may continue to analyze 602 updated traffic logs 112.

If the monitoring agent 114 determines 608 that the network device 106 does not generate network traffic according to the pattern, the network device 106 may be determined to be offline. The monitoring agent 114 may then send 610 an alert 236 to a user device 110 indicating that the network device 106 is offline.

Figure 7:
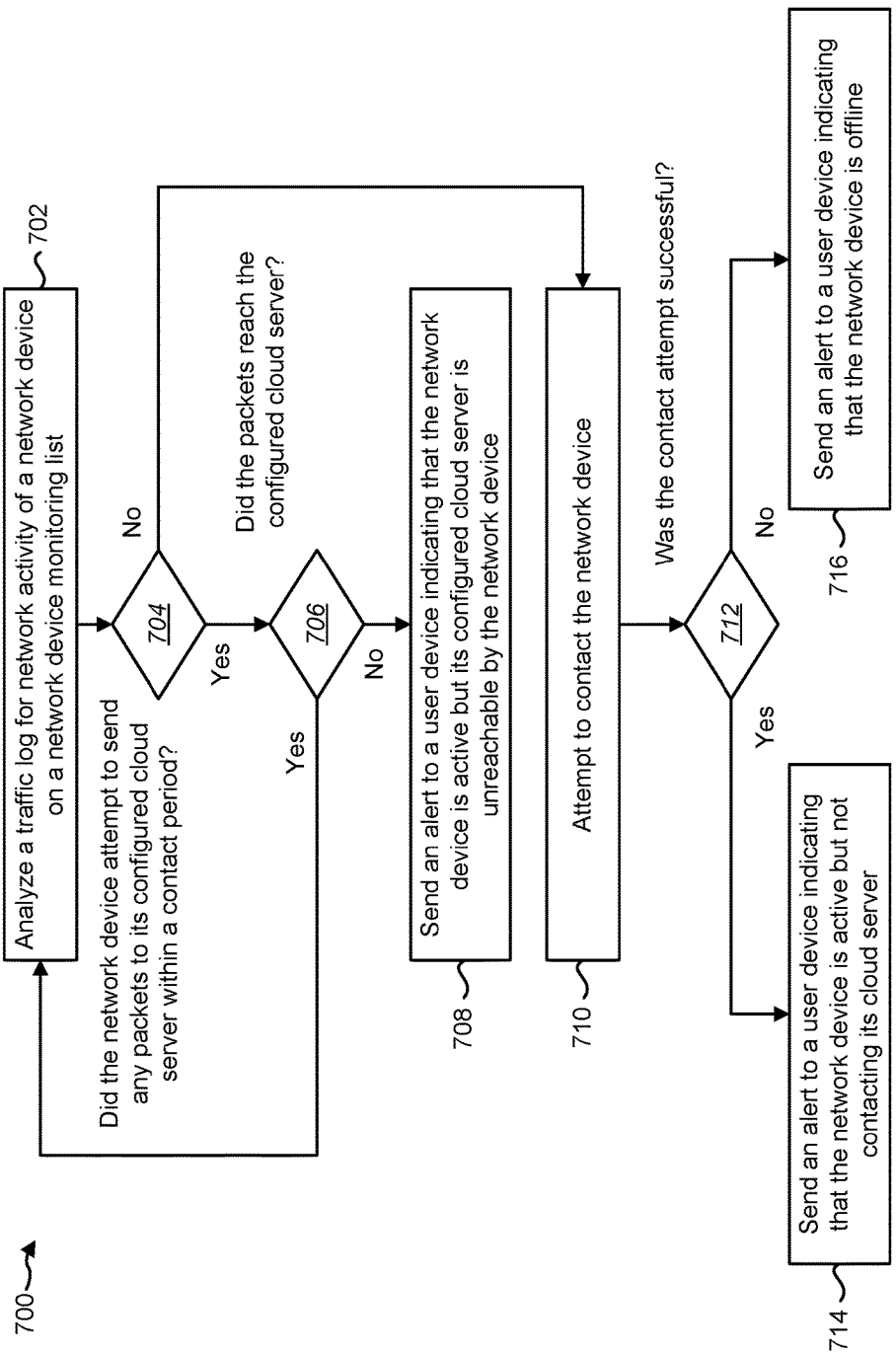
FIG. 7 is a flow diagram illustrating yet another configuration of a method for monitoring a network device.

FIG. 7 is a flow diagram illustrating yet another configuration of a method 700 for monitoring a network device 106. The method 700 may be implemented by a monitoring agent 114 that is included in a router 102, a management server 104 or another computing device. Therefore, the method 700 may be performed by a router 102 that generates a traffic log 112. Alternatively, the method 700 may be performed by a monitoring device (e.g., management server 104) that receives a traffic log 112 from a router 102 or other non-IP based logging device.

The monitoring agent 114 may analyze 702 a traffic log 112 for network activity of a network device 106 in a network device monitoring list 216. For example, the monitoring agent 114 may check whether the network device 106 generated one or more packets that start from a LAN of the network device 106 and go to its configured cloud server 108 via a WAN.

The monitoring agent 114 may determine 704 whether the network device 106 attempted to send any packets to its configured cloud server 108 within a certain contact period 224. This may be indicated in the traffic log 112 as traffic (e.g., packets) originating from the network device 106 that is addressed to the cloud server 108.

If the network device 106 did attempt to send packets to the cloud server 108 within the contact period 224, the monitoring agent 114 may determine 706 whether the packets reached the configured cloud server 108. In other words, the monitoring agent 114 may determine whether the network device 106 was successful in contacting the cloud server 108. This may be indicated in the traffic log 112 as response traffic (e.g., packets) coming back from the cloud server 108 to the network device 106.

If network device 106 successfully contacted the cloud server 108 (i.e., the packets reached the cloud server 108), then the monitoring agent 114 may continue to analyze 702 updated traffic logs 112. However, if the monitoring agent 114 determines 706 that the network device 106 was unsuccessful in contacting the cloud server 108 (i.e., the packets did not reach the cloud server 108), then the monitoring agent 114 may send 708 an alert 236 to a user device 110 indicating that the network device 106 is active but the cloud server 108 is unreachable by the network device 106.

If the monitoring agent 114 determines 704 that the network device 106 did not attempt to send any packets to its configured cloud server 108 within the contact period 224, then the monitoring agent 114 may attempt 710 to contact the network device 106. In an implementation, the monitoring agent 114 may ping the network device 106. If the network device 106 does not respond to the ping, then the monitoring agent 114 may issue a sleep override command. For example, the monitoring agent 114 may send the sleep override command based on the sleep override information 228 for the network device 106. This may include sending a wake-on-LAN (WoL) command to the network device 106 or sending a message to a specific logical port of the network device 106 that wakes the network device 106 from sleep state.

The monitoring agent 114 may determine 712 whether the contact attempt was successful. For example, the monitoring agent 114 may determine 712 whether the network device 106 responded to the ping or sleep override command. If the contact attempt was successful, the monitoring agent 114 may send 714 an alert 236 to a user device 110 indicating that the network device 106 is active but not contacting its cloud server 108. If the contact attempt was not successful, the monitoring agent 114 may send 716 an alert 236 to a user device 110 indicating that the network device 106 is offline.

Figure 8:
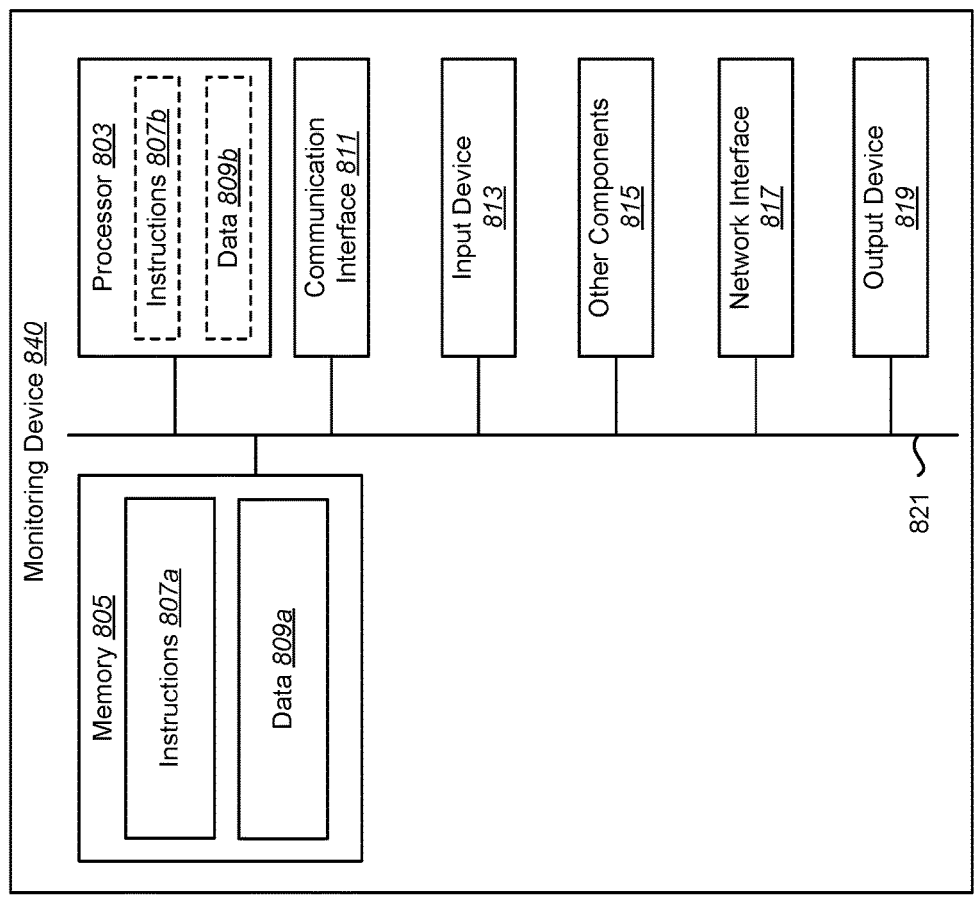
FIG. 8 is a block diagram illustrating various components that may be utilized in a monitoring device.

FIG. 8 is a block diagram illustrating various components that may be utilized in a monitoring device 840. Examples of a monitoring device 840 include a router 102 and management server 104 described in connection with FIG. 1. Although only the monitoring device 840 is shown, the configurations herein may be implemented in a distributed system using many electronic devices.

A monitoring device 840 may include a broad range of digital computers, including microcontrollers, hand-held computers, personal computers, servers, mainframes, supercomputers, minicomputers, workstations and any variation or related device thereof. In some configurations, the monitoring device 840 may be an appliance. Additionally or alternatively, the monitoring device 840 may be an embedded device inside an otherwise complete device (e.g., within an appliance).

The monitoring device 840 is shown with a processor 803 and memory 805. The processor 803 may control the operation of the monitoring device 840 and may be embodied as a microprocessor, a microcontroller, a digital signal processor (DSP) or other device known in the art. The processor 803 typically performs logical and arithmetic operations based on program instructions 807a and/or data 809a stored within the memory 805. The instructions 807a in the memory 805 may be executable to implement the methods described herein. FIG. 8 illustrates instructions 807b and/or data 809b being loaded onto the processor 803. The instructions 807b and/or data 809b may be the instructions 807a and/or data 809a (or portions thereof) stored in memory 805.

The monitoring device 840 may also include one or more communication interfaces 811 and/or network interfaces 817 for communicating with other electronic devices. The communication interface(s) 811 and the network interface(s) 817 may be based on wired communication technology and/or wireless communication technology, such as ZigBee®, WiMax®, WiFi®, Bluetooth® and/or cellular protocols, such as GSM®, etc.

The monitoring device 840 may also include one or more input devices 813 and one or more output devices 819. The input devices 813 and output devices 819 may facilitate user input/user output. Other components 815 may also be provided as part of the monitoring device 840.

Instructions 807a and data 809a may be stored in the memory 805. The processor 803 may load and execute instructions 807b from the instructions 807a in memory 805 to implement various functions. Executing the instructions 807a may involve the use of the data 809a that is stored in the memory 805. The instructions 807b and/or data 809b may be loaded onto the processor 803. The instructions 807 are executable to implement the one or more methods shown herein and the data 809 may include one or more of the various pieces of data described herein.

The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers and so forth, including combinations thereof. The various components of the monitoring device 840 may be coupled together by a bus system 821, which may include a power bus, a control signal bus and a status signal bus, in addition to a data bus. However, for the sake of clarity, the various buses are illustrated in FIG. 8 as the bus system 821.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for monitoring a network device, comprising:
   analyzing a traffic log that records network activity between the network device and a cloud server, wherein analyzing the traffic log comprises checking whether the network device generated one or more packets that start from a local area network (LAN) of the network device and go to the cloud server via a wide area network (WAN);
   determining that the network device is offline based on the traffic log analysis, wherein determining that the network device is offline comprises:
      detecting a pattern of when the network device generates network traffic; and
      determining that the network device stopped generating the network traffic according to the pattern; and
   sending an alert to a user device indicating that the network device is offline.

2. The method of claim 1, wherein the network device is configured to periodically exit a sleep mode, connect to the local area network (LAN) and communicate with the cloud server via the wide area network (WAN).

3. The method of claim 1, wherein determining that the network device is offline comprises:
   determining that the network device did not send any packets to the cloud server within a certain period of time.

4. The method of claim 3, wherein the certain period of time is pre-defined or user-specified.

5. The method of claim 1, wherein the method is performed by a router that generates the traffic log.

6. The method of claim 1, wherein the method is performed by a monitoring device that receives the traffic log from a router that generates the traffic log.

7. The method of claim 6, wherein the monitoring device is a management server.

8. The method of claim 6, further comprising:
   receiving an updated traffic log from the router on a periodic basis; and
   analyzing the updated traffic log to determine whether the network device is offline.

9. The method of claim 1, wherein the network device is included in a network device monitoring list comprising network devices to be monitored for online activity, wherein a router configures the traffic log according to the network device monitoring list.

10. The method of claim 1, further comprising attempting to contact the network device before sending the alert, wherein the alert is sent when the contact attempt is unsuccessful.

11. The method of claim 1, wherein the alert is sent to the user device through a management server.

12. A router configured for monitoring a network device, comprising:
   a processor; and
   memory in electronic communication with the processor, wherein instructions stored in the memory are executable to:
      generate a traffic log that records network activity of the network device;
      analyze the traffic log for the network activity between the network device and a cloud server, wherein the instructions executable to analyze the traffic log comprise the instructions executable to check whether the network device generated one or more packets that start from a local area network (LAN) of the network device and go to the cloud server via a wide area network (WAN);
      determine that the network device is offline based on the traffic log analysis, wherein the instructions executable to determine that the network device is offline comprise instructions executable to:
         detect a pattern of when the network device generates network traffic; and
         determine that the network device stopped generating the network traffic according to the pattern; and
      send an alert to a user device indicating that the network device is offline.

13. The router of claim 12, wherein the instructions executable to determine that the network device is offline further comprise instructions executable to:
   determine that the network device did not send any packets to the cloud server within a certain period of time.

14. The router of claim 12, further comprising instructions executable to:
   receive, from a management server, a network device monitoring list comprising network devices to be monitored for online activity; and
   configure the traffic log according to the network device monitoring list.

15. The router of claim 12, further comprising instructions executable to:
   attempt to contact the network device before sending the alert, wherein the alert is sent when the contact attempt is unsuccessful.

16. The router of claim 12, wherein the alert is sent to the user device through a management server.

17. A management server configured for monitoring a network device, comprising:
   a processor; and
   memory in electronic communication with the processor, wherein instructions stored in the memory are executable to:
      receive, from a router, a traffic log that records network activity of the network device;
      analyze the traffic log for the network activity between the network device and a cloud server, wherein the instructions executable to analyze the traffic log comprise the instructions executable to check whether the network device generated one or more packets that start from a local area network (LAN) of the network device and go to the cloud server via a wide area network (WAN);
      determine that the network device is offline based on the traffic log analysis, wherein the instructions executable to determine that the network device is offline comprise instructions executable to:
         detect a pattern of when the network device generates network traffic; and
         determine that the network device stopped generating the network traffic according to the pattern; and
      send an alert to a user device indicating that the network device is offline.

18. The management server of claim 17, wherein the instructions executable to determine that the network device is offline further comprise instructions executable to:
   determine that the network device did not send any packets to the cloud server within a certain period of time.

19. The management server of claim 17, further comprising instructions executable to:
   send, to the router, a network device monitoring list comprising network devices to be monitored for online activity, wherein the router configures the traffic log according to the network device monitoring list.

20. The management server of claim 17, further comprising instructions executable to:
   attempt to contact the network device before sending the alert, wherein the alert is sent when the contact attempt is unsuccessful.

* * * * *